US012712857B2

(12) United States Patent
Li

(10) Patent No.: US 12,712,857 B2
(45) Date of Patent: Aug. 18, 2026

(54) MESSAGE PROCESSING METHOD AND APPARATUS, AND ELECTRONIC DEVICE

(71) Applicant: Honor Device Co., Ltd., Shenzhen (CN)

(72) Inventor: Ping Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 78 days.

(21) Appl. No.: 18/839,894

(22) PCT Filed: Apr. 17, 2023

(86) PCT No.: PCT/CN2023/088670
§ 371 (c)(1),
(2) Date: Aug. 20, 2024

(87) PCT Pub. No.: WO2024/040992
PCT Pub. Date: Feb. 29, 2024

(65) Prior Publication Data

US 2025/0158968 A1 May 15, 2025

(30) Foreign Application Priority Data

Aug. 22, 2022 (CN) ......................... 202211008092.9
Feb. 7, 2023 (CN) ......................... 202310129070.6

(51) Int. Cl.
*H04L 9/40* (2022.01)
*H04L 51/224* (2022.01)
*H04L 67/55* (2022.01)

(52) U.S. Cl.
CPC ........ *H04L 63/0428* (2013.01); *H04L 51/224* (2022.05); *H04L 67/55* (2022.05)

(58) Field of Classification Search
CPC ... H04L 63/0428; H04L 51/224; H04L 67/55; H04L 51/214; H04L 63/10; H04L 9/40;
(Continued)

(56) References Cited

U.S. PATENT DOCUMENTS 6,393,568 B1 * 5/2002 Ranger ................. G06F 21/562 713/188
9,582,680 B2 * 2/2017 Bilodeau ............. G06F 16/9535
(Continued)

FOREIGN PATENT DOCUMENTS

CN 104767746 A 7/2015
CN 106302816 A 1/2017
(Continued)

*Primary Examiner* — Mohammed Waliullah
(74) *Attorney, Agent, or Firm* — Leydig, Voit & Mayer, Ltd.

(57) ABSTRACT

Embodiments of this application provide a message processing method and apparatus, and an electronic device. The method is applied to a terminal device, and the method includes: receiving a first message; and pulling up a first application when the first message is a reassembly message, so that the first application performs message reassembly on the first message, including: reading, by the first application, message reassembly configuration information, and performing a message reassembly operation on the first message based on the message reassembly configuration information, to generate a second message. According to the method in the embodiments of this application, after a pushed message is received, the first application is pulled up to reassemble the message, so as to improve user experience of message display.

19 Claims, 5 Drawing Sheets

(58) Field of Classification Search
CPC . H04L 12/1859; H04L 51/046; G06F 21/602; G06F 21/606; G06F 21/53; G06F 21/604
See application file for complete search history.

(56) References Cited

U.S. PATENT DOCUMENTS

| | | | | |
|---|---|---|---|---|
| 2004/0068649 | A1* | 4/2004 | Haller | G06Q 99/00 713/153 |
| 2007/0255704 | A1* | 11/2007 | Baek | G16H 10/60 |
| 2011/0239113 | A1* | 9/2011 | Hung | G16H 15/00 715/271 |
| 2014/0047551 | A1* | 2/2014 | Nagasundaram | G06F 16/285 726/26 |
| 2017/0279795 | A1* | 9/2017 | Redberg | H04L 63/0861 |
| 2017/0359285 | A1* | 12/2017 | Weinig | H04L 51/066 |

FOREIGN PATENT DOCUMENTS

| | | | |
|---|---|---|---|
| CN | 110392155 | A | 10/2019 |
| CN | 113360238 | A | 9/2021 |
| CN | 114584613 | A | 6/2022 |
| CN | 114885018 | A | 8/2022 |
| WO | 2018082465 | A1 | 5/2018 |

* cited by examiner

Message processing apparatus 500

Receiving module 510

Message reassembly module 520

First application module 530

MESSAGE PROCESSING METHOD AND APPARATUS, AND ELECTRONIC DEVICE

CROSS-REFERENCE TO RELATED APPLICATIONS

This application is a national stage of International Application No. PCT/CN2023/088670, filed on Apr. 17, 2023, which claims priority to Chinese Patent Application No. 202211008092.9, filed on Aug. 22, 2022, and Chinese Patent Application No. 202310129070.6, filed on Feb. 7, 2023. The disclosures of each of the aforementioned applications are hereby incorporated by reference in their entireties.

TECHNICAL FIELD

This application relates to the field of computer technologies, and in particular, to a message processing method and apparatus, and an electronic device.

BACKGROUND

Nowadays, terminal devices including a mobile phone, a tablet computer, a watch, a television, a personal computer, and the like provide a push (Push) capability of sending a message from a cloud server to a terminal. The implementation of a Push message generally includes two types: a notification message and a transparent message. For the transparent message, an application is directly pulled up, and data is transferred to the application. The application can make different behaviors based on the transferred data. For the notification message, an application is not pulled up, and a system component displays the notification message based on data content of Push, for example, displays the notification message in a system notification area (for example, prompts a user with push notification information of the application in a pull-down notification bar of Android/iOS or a tile of Windows).

For the notification message, the application is not pulled up. The notification message is designed in such a way to control resource occupation of the terminal device and reduce interference to the user. However, in the design solution, content transferred in the Push notification message needs to be plaintext and cannot be modified. As a result, the terminal device cannot protect sensitive information in the notification message, and cannot provide personalized display of the notification message.

SUMMARY

In view of a problem of a push notification message in the conventional technology, this application provides a message processing method and apparatus, and an electronic device, and this application further provides a computer-readable storage medium.

The following technical solutions are used in embodiments of this application:

According to a first aspect, this application provides a message processing method, where the method is applied to a terminal device, and the method includes:

receiving a first message; and pulling up a first application when the first message is a reassembly message, so that the first application performs message reassembly on the first message, including:

reading, by the first application, message reassembly configuration information, where the message reassembly configuration information is information configured by a second application for the first application, an operation capable of being implemented by the second application includes at least a message reassembly operation, and the message reassembly configuration information is used to support the first application in implementing the message reassembly operation; and performing, by the first application, the message reassembly operation on the first message based on the message reassembly configuration information, to generate a second message.

According to the method in the embodiments of this application, after a pushed message is received, the first application is pulled up to reassemble the message, so as to improve user experience of message display. Further, the first application is only used to implement the message reassembly operation of the second application, and the first application does not need to have a complete structure of the second application. Therefore, a hardware resource occupied by pulling up the first application is fewer than a hardware resource occupied by pulling up the second application. This effectively controls hardware resource occupation of the terminal device while improving user experience of notification message display.

In an implementation of the first aspect, to improve data security and avoid leakage of the first message, the first application is a trusted application.

In an implementation of the first aspect, to improve data security and avoid leakage of the message reassembly configuration information, the message reassembly configuration information is stored in a trusted credential of the first application.

Because the message reassembly configuration information is stored in the trusted credential of the first application, an application service that pulls up the first application cannot access the trusted credential of the first application. Therefore, the application service that pulls up the first application cannot obtain the message reassembly configuration information, thereby ensuring security of performing the message reassembly operation.

In an implementation of the first aspect, the message reassembly configuration information includes message reassembly code and an initialization parameter; and the performing, by the first application, the message reassembly operation on the first message based on the message reassembly configuration information, to generate a second message includes:

executing, by the first application, the message reassembly code for the first message based on the initialization parameter, to generate the second message.

In an implementation of the first aspect, before the receiving a first message, the method further includes:

invoking, by the second application, the first application, to set the message reassembly configuration information.

In an implementation of the first aspect, to improve security, before the receiving a first message, the method further includes: obtaining, from a cloud, a range of resources and interfaces that the first application is allowed to access; and the performing, by the first application, the message reassembly operation on the first message based on the message reassembly configuration information, to generate a second message includes:

performing, by the first application, the message reassembly operation on the first message based on the message reassembly configuration information under a limitation of the range of resources and interfaces that the first application is allowed to access, to generate the second message.

Based on the limitation of the range of accessed resources and interfaces, in a process in which the message reassembly operation is performed in the first application, only a controllable interface such as a basic data operation, encryption/decryption, and a corresponding application resource query is provided, and the first application cannot pull up another application and access another controlled resource, thereby improving system running security.

Specifically, in an implementation of the first aspect, the obtaining, from a cloud, a range of resources and interfaces that the first application is allowed to access includes: obtaining, by a push agent from the cloud, the range of resources and interfaces that the first application is allowed to access.

In an implementation of the first aspect, the method further includes:

outputting the second message for display.

In an implementation of the first aspect, the outputting the second message for display includes:

outputting, by the first application, the second message to a push agent; and outputting, by the push agent, the second message to a notification manager for message display.

In an implementation of the first aspect, the method further includes:

if an exception occurs when the first application performs the message reassembly operation, preventing display of the second message.

In an implementation of the first aspect, the receiving a first message includes: receiving, by a push agent, the first message; and the invoking, when the first message is a reassembly message, a first application to perform message reassembly on the first message includes: when the push agent determines that the first message is a reassembly message, pulling up, by the push agent, the first application, so that the first application performs message reassembly on the first message.

In an implementation of the first aspect, before the receiving a first message, the method further includes:

applying, by the second application, to the push agent for a push token;

after receiving the application of the second application, setting, by the push agent, to allow the second application to invoke the first application, and returning, by the push agent, the push token to the second application;

after the second application obtains the push token, invoking, by the second application, the first application, to set the message reassembly configuration information for the first application; and storing, by the first application, the message reassembly configuration information.

In an implementation of the first aspect, to improve data security, the first message is end-to-end encrypted information; and in a process in which the first application performs the message reassembly operation on the first message, the first application invokes an encryption/decryption interface to decrypt the first message.

The application service that pulls up the first application does not participate in a decryption operation, and therefore cannot obtain specific content of the first message. In an entire process from receiving the pushed first message to displaying the second message, the application service that pulls up the first application can obtain only content obtained after message reassembly, thereby greatly improving message security.

According to a second aspect, this application further provides a message processing apparatus, where the apparatus is applied to a terminal device, and the apparatus includes:

a receiving module, configured to receive a first message;

a message reassembly module, configured to pull up a first application module when the first message is a reassembly message; and the first application module, configured to:

read message reassembly configuration information, where the message reassembly configuration information is information configured by a second application module for the first application module, an operation capable of being implemented by the second application module includes at least a message reassembly operation, and the message reassembly configuration information is used to support the first application module in implementing the message reassembly operation; and perform the message reassembly operation on the first message based on the message reassembly configuration information, to generate a second message.

According to a third aspect, this application further provides an electronic device, where the electronic device includes a memory configured to store a computer program instruction and a processor configured to execute a computer program instruction, and when the computer program instruction is executed by the processor, the electronic device is triggered to perform the steps of the method according to the first aspect.

According to a fourth aspect, this application further provides a computer-readable storage medium, where the computer-readable storage medium stores a computer program, and when the computer program is run on a computer, the computer is enabled to perform the method according to the first aspect.

DESCRIPTION OF EMBODIMENTS

To make the objective, technical solutions, and advantages of this application clearer, the technical solutions of this application are clearly described below with reference to specific embodiments of this application and corresponding accompanying drawings. It is clear that the described embodiments are merely some but not all of embodiments of this application. Based on the embodiments of this application, all other embodiments obtained by a person of ordinary skill in the art without creative efforts fall within the protection scope of this application.

Terms used in the DESCRIPTION OF EMBODIMENTS section of this application are only used to explain specific embodiments of this application, and are not intended to limit this application.

Figure 1:
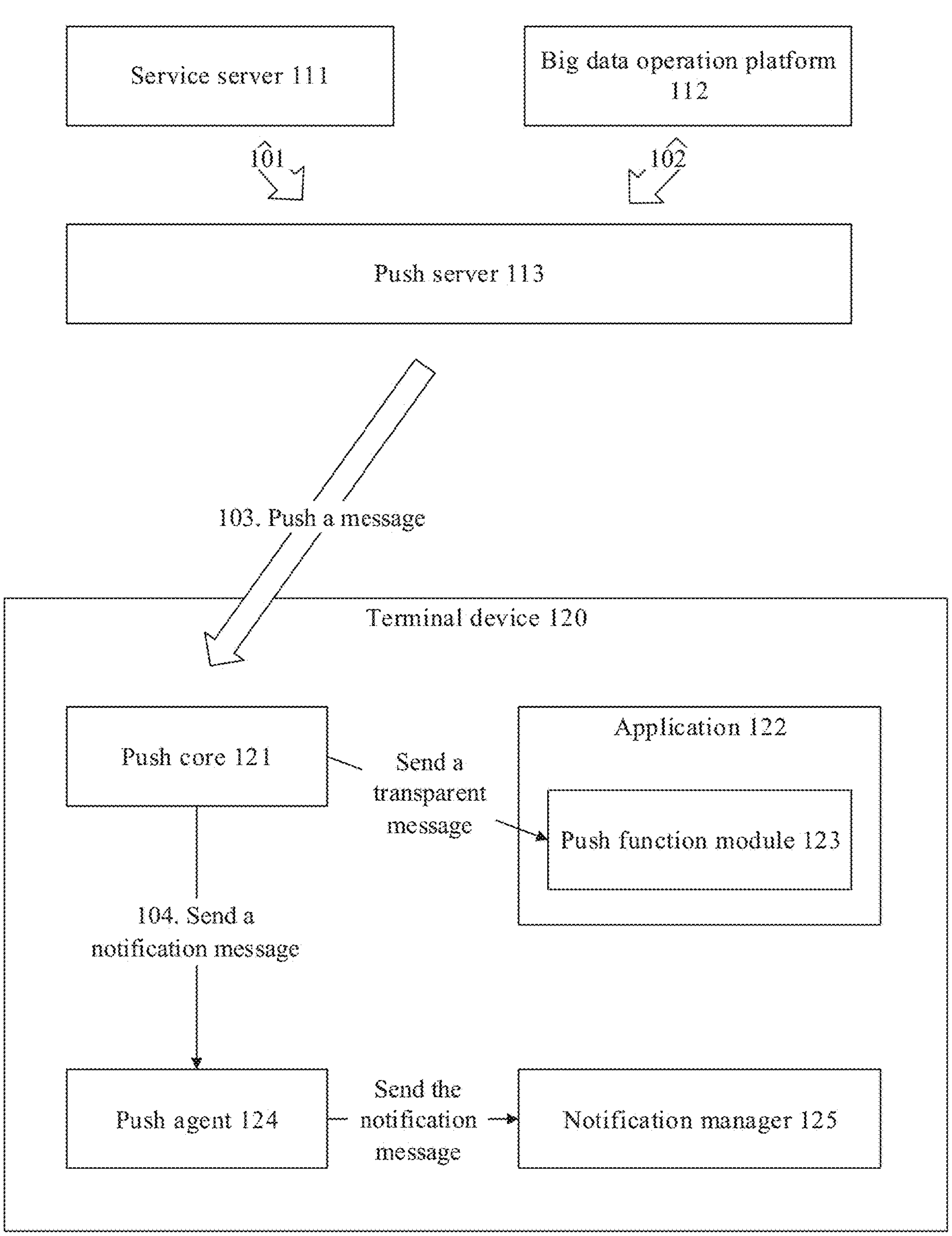
FIG. 1 is a schematic diagram of a message push procedure according to an embodiment of this application.

FIG. 1 is a schematic diagram of a message push procedure according to an embodiment of this application.

As shown in FIG. 1, when a service server 111 and a big data operation platform 112 need to push a message to a terminal device 120, the service server 111 and the big data operation platform 112 first push the message to a push server (PushServer) 113.

The push server 113 sends, to the terminal device 120, the message that needs to be pushed.

A push core (Push Core) 121 of the terminal device 120 receives the message pushed by the Push server 113, and classifies the received push message.

If the push message is a transparent message, an application (App) 122 that needs to receive the transparent message is pulled up. The application 122 receives the transparent message based on a push function module 123 (push software development kit (Push SDK)) of the application 122. Then, the application 122 performs corresponding information processing on the transparent message.

When the push message is a transparent message, the terminal device 120 needs to pull up the application 122 used to process the transparent information. Starting and running of the application 122 necessarily occupy a hardware resource of the terminal device 120.

If the push message is a notification message, the push core 121 directly sends the notification message to a push agent (Push Agent) 124, and the push agent 124 sends the notification message to a notification manager (Notification-Manager) 125 for message display.

When the push message is a notification message, the terminal device 120 does not need to pull up an application used to process the message, and an increase in hardware resource occupation is avoided. However, because the push agent 124 directly sends the notification message to the notification manager 125 for message display, the terminal device 120 can display only content of the pushed notification message fully, and cannot perform personalized content modification. As a result, the notification message cannot be displayed in a personalized manner, and sensitive information is shielded.

Further, the push agent 124 directly sends the notification message to the notification manager 125 for message display, and the terminal device 120 does not pull up the application to process the notification message. Therefore, the terminal device 120 cannot perform a decryption operation on the notification message, and the notification message needs to be plaintext in an entire transmission process. In a process of transmitting the notification message, the notification message is easily leaked.

For example, in a data transmission process (101) in which the service server 111 pushes the notification message to the Push server 113, in a data transmission process (102) in which the big data operation platform 112 pushes the notification message to the Push server 113, in a data transmission process (103) in which the Push server 113 pushes the notification message to the push core 121 of the terminal device 120, and in a data transmission process (104) in which the push core 121 sends the notification message to the push agent 124, if a data transmission protocol is cracked, a cracker may obtain content of the plaintext notification message.

For another example, the service server 111 and the big data operation platform 112 push the plaintext notification message to the Push server 113, and the Push server 113 pushes the plaintext notification message to the push core 121 of the terminal device 120. Therefore, the notification message temporarily stored in the Push server 113 is also plaintext. If the Push server 113 is attacked, content of the plaintext notification message may be leaked.

In view of the foregoing case, an embodiment of this application provides a message processing method, and the method is applied to a terminal device. In the message processing method in an embodiment of this application, after a pushed notification message is received, an application is pulled up to reassemble the notification message (for example, delete sensitive information, and reassemble a text description manner of the message based on a personalized requirement of a user), and the reassembled notification message is output and displayed, thereby improving user experience of notification message display.

Further, when the pushed message is a transparent message, the terminal device pulls up an application (a second application) for the transparent message, to process the transparent message. Therefore, based on an implementation solution of the transparent message, when the second application has a function of implementing a message reassembly operation, and the terminal device receives a notification message that needs to be reassembled, the terminal device may pull up the second application, so that the second application reassembles the notification message, and then the second application outputs and displays the reassembled message. Although the foregoing solution may improve user experience of notification message display, because the second application needs to be pulled up, hardware resource occupation of the terminal device is increased.

In view of the foregoing problem that hardware resource occupation of the terminal device is increased, in the message processing method in an embodiment of this application, a first application is constructed based on the second application, and the first application is used to implement the message reassembly operation of the second application. In this way, when the terminal device receives the notification message that needs to be reassembled, the terminal device may pull up the first application, so that the first application reassembles the notification message, and then the first application outputs and displays the reassembled message. The first application is only used to implement the message reassembly operation of the second application, and the first application does not need to have a complete structure of the second application. Therefore, a hardware resource occupied by pulling up the first application is fewer than a hardware resource occupied by pulling up the second application. This effectively controls hardware resource occupation of the terminal device while improving user experience of notification message display.

Figure 2:
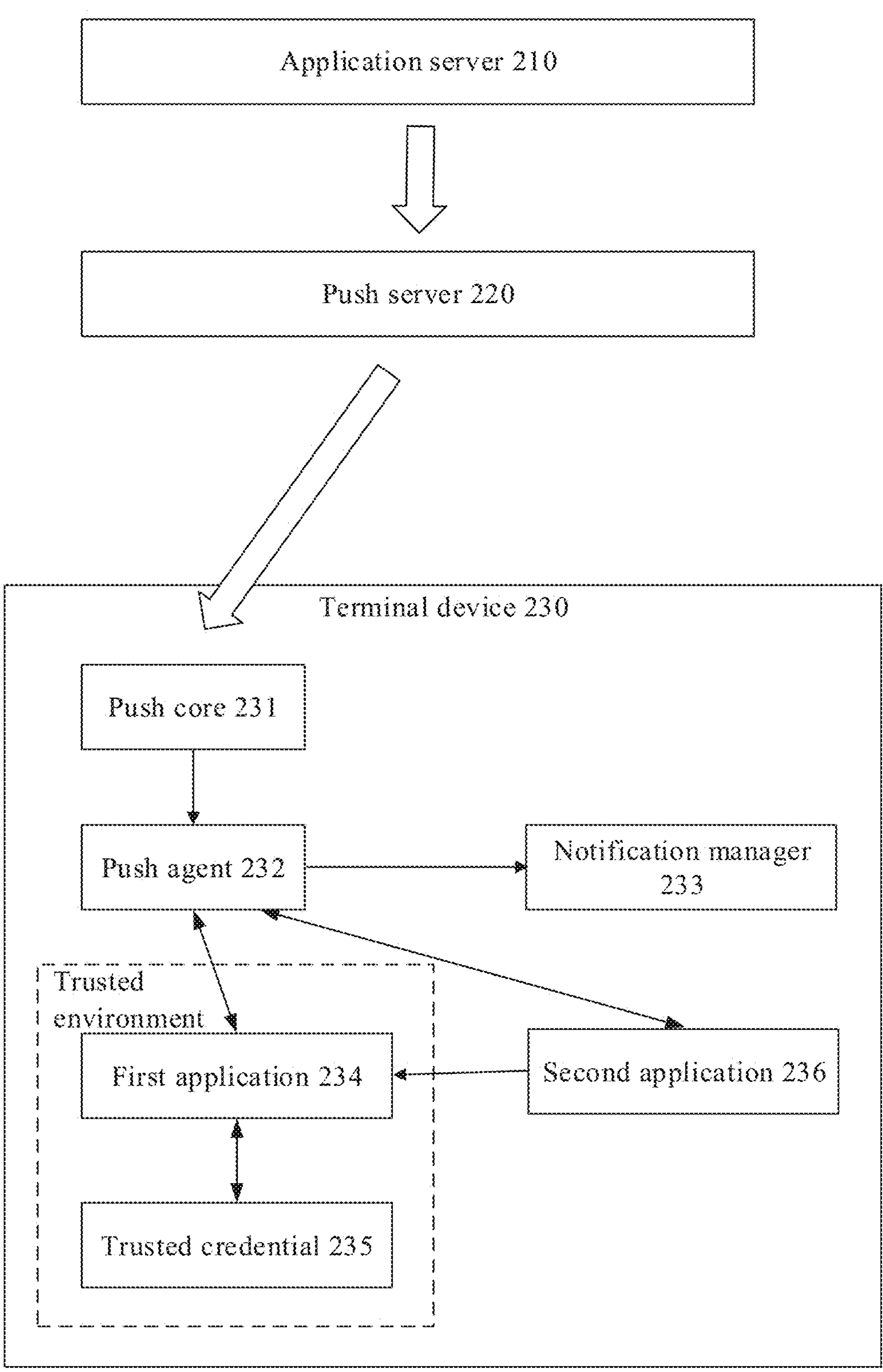
FIG. 2 is a schematic diagram of a message push application scenario according to an embodiment of this application.
Figure 3:
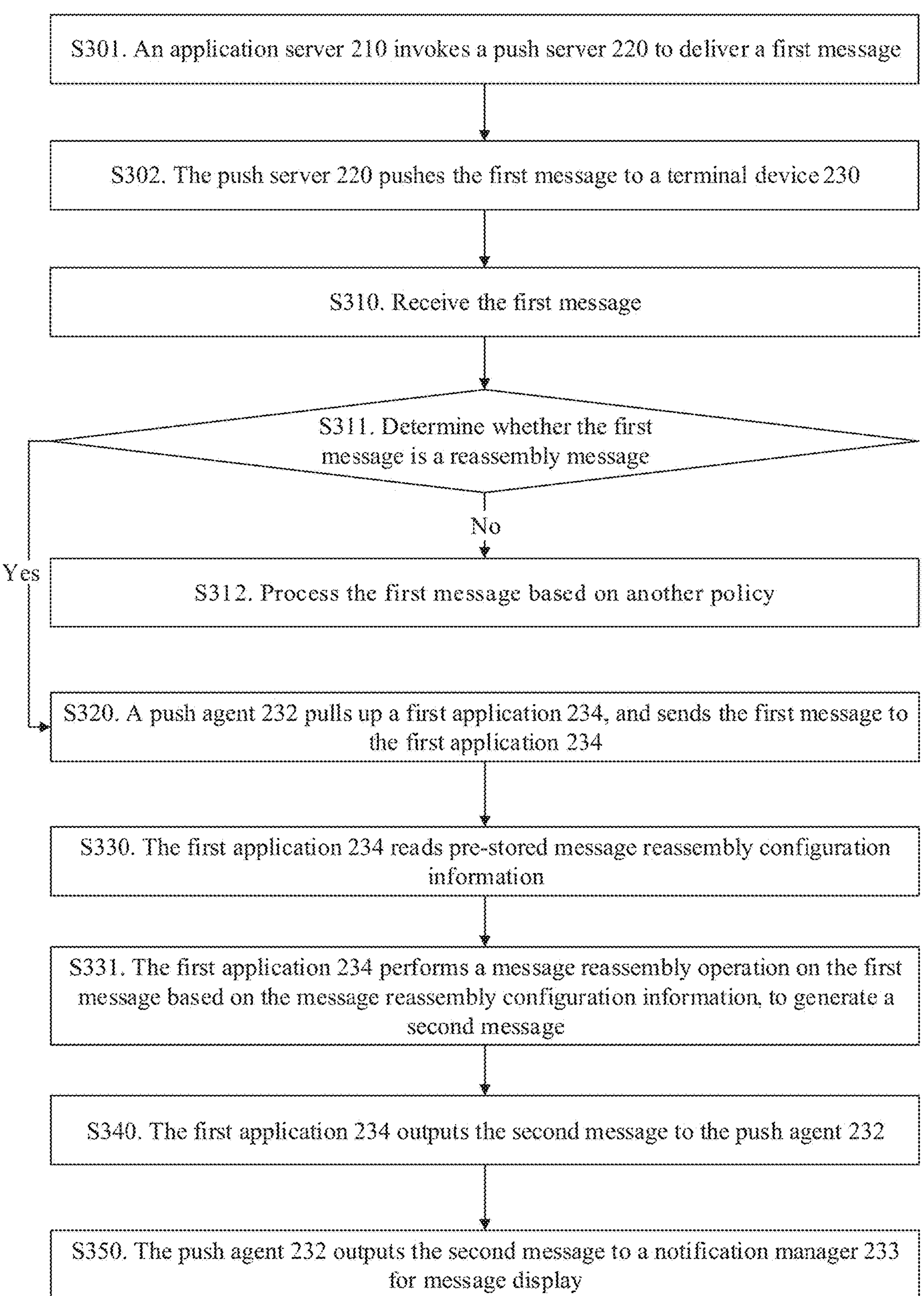
FIG. 3 is a flowchart of a message processing method according to an embodiment of this application.

FIG. 2 is a schematic diagram of a message push application scenario according to an embodiment of this application. FIG. 3 is a flowchart of a message processing method according to an embodiment of this application.

As shown in FIG. 2 and FIG. 3, in the message push application scenario, an application (App) server 210 of a cloud invokes a push server (PushServer) 220 to deliver a first message (for example, a transparent message or a notification message) (S301). The push server 220 pushes, to a terminal device 230, the first message delivered by the application server 210 (S302).

The terminal device 230 performs the following procedure shown in FIG. 2, to implement message processing.

S310. A push core 231 of the terminal device 230 receives the first message pushed by the push server 220.

S311. The terminal device 230 determines whether the first message is a reassembly message.

If the first message is not a reassembly message, the first message is processed based on another policy (S312).

If the first message is a reassembly message, a first application 234 is pulled up, so that the first application 234 performs a message reassembly operation on the first message (S320).

Specifically, the message reassembly operation may include a plurality of pieces of different operation content. This is not limited in this application. For example, a combination manner of elements in the message is rearranged, a message style is changed, a message icon and background are added, and a specified element/variable in the message is replaced. For example, the delivered message is: "Dear {name}, the {service} you purchased is about to expire. . .", and variables {name} and {service} in the message are replaced in a message reassembly process.

Specifically, in an actual application scenario, the first information may be marked as a reassembly message in a plurality of manners.

For example, in an implementation, the reassembly message is marked by adding a mark. In a process in which the application server 210 delivers the first message, if the first message is a reassembly message, a first mark used to mark the reassembly message is added into the first information.

For another example, in another implementation, the reassembly message is marked by binding an information source. That the application server 210 is an information source of the reassembly message is recorded at the terminal device 230. The first message delivered by the application server 210 includes information source information. If the terminal device 230 identifies that an information source of the first message is the application server 210, the terminal device 230 may determine that the first message is a reassembly message.

In an implementation of S311, the reassembly message is a notification message on which the message reassembly operation needs to be performed.

In S311, the push core 231 of the terminal device 230 determines a type of the first message (a notification message or a transparent message). If the first message is a transparent message (that is, it may be determined that the first message is not a reassembly message), the push core 231 pulls up a corresponding application based on a processing policy of the transparent message, to process the first message. If the first message is a notification message, the push core 231 sends the first message to a push agent 232. The push agent 232 determines whether the message reassembly operation needs to be performed on the first message (for example, performs determining by determining whether the first mark is included, or performs determining by using the information source). If the message reassembly operation does not need to be performed on the first message (that is, it may be determined that the first message is not a reassembly message), the push agent 232 sends the first message to a notification manager 233 for message display.

If the message reassembly operation needs to be performed on the first message (the first message is a reassembly message), the push agent 232 performs S320.

In another implementation of S311, the reassembly message is a notification message on which the message reassembly operation needs to be performed or a transparent message on which only the message reassembly operation needs to be performed.

In S311, the push core 231 of the terminal device 230 determines whether the message reassembly operation needs to be performed on the first message (for example, performs determining by determining whether the first mark is included, or performs determining by using the information source).

If the message reassembly operation needs to be performed on the first message, the push core 231 adds a second mark into the first message, and sends, to a push agent 232, the first message into which the second mark is added. After the push agent 232 identifies that the first message has the first mark, the push agent 232 performs S320.

If the message reassembly operation does not need to be performed on the first message (that is, it may be determined that the first message is not a reassembly message), the push core 231 determines a type of the first message (a notification message or a transparent message). If the first message is a transparent message, the push core 231 pulls up a corresponding application based on a processing policy of the transparent message, to process the first message. If the first message is a notification message, the push core 231 sends the first message to a push agent 232. After identifying that the first message does not have the first mark, the push agent 232 sends the first message to a notification manager 233 for message display.

S320. The push agent 232 pulls up the first application 234, and sends the first message to the first application 234.

Specifically, to improve data security and avoid leakage of the first message, in an embodiment, the first application 234 is a trusted application (TA), and runs in a trusted execution environment (TEE) in a terminal system operating system. The push agent 232 is a client applicant (CA) that can invoke a trusted application (first application 234).

S330. The first application 234 reads pre-stored message reassembly configuration information.

Specifically, to improve data security and avoid leakage of the message reassembly configuration information, in an embodiment, the message reassembly configuration information is stored in a trusted credential 235 of the first application 234 (TA).

Because the message reassembly configuration information is stored in the trusted credential 235 of the first application 234, the push agent 232 can pull up only the first application 234, but cannot access the trusted credential 235 of the first application 234. Therefore, the push agent 232 cannot obtain the message reassembly configuration information, thereby ensuring security of performing the message reassembly operation.

Further, in another embodiment, the message reassembly configuration information may be stored at another location.

S331. The first application 234 performs the message reassembly operation on the first message based on the message reassembly configuration information, to generate a second message.

After S331, the first application 234 outputs the second message for display.

S340. The first application 234 outputs the second message to the push agent 232.

S350. The push agent 232 outputs the second message to the notification manager 233 for message display.

Specifically, in S330 and S331, for different message reassembly configuration information, the first application 234 may implement different message reassembly operations. For example, based on first message reassembly configuration information, the first application 234 is run to perform the message reassembly operation on the message, so as to delete a sensitive word in the message. Based on second message reassembly configuration information, the first application is run to perform the message reassembly operation on the message, so as to split a long-sentence message into a short-sentence message.

Specifically, in an embodiment, the message reassembly configuration information includes message reassembly code and an initialization parameter. In S331, the first application 234 executes the read message reassembly code for the first message based on the read initialization parameter, to generate the second message.

Further, in another embodiment, the message reassembly configuration information may be of another different content structure.

For example, in another embodiment, a unified initialization parameter is built in the first application 234, and the message reassembly configuration information includes message reassembly code. In S331, the first application 234 executes the read message reassembly code for the first message based on the built-in initialization parameter, to generate the second message.

For another example, in another embodiment, the first application 234 includes message reassembly code, and the message reassembly configuration information includes an initialization parameter. In S331, the first application 234 executes the read message reassembly code in the first application for the first message based on the read initialization parameter, to generate the second message.

Further, in S331, in addition to performing the message reassembly operation on the first message, the first application 234 may further perform another processing operation.

For example, in an embodiment, to reduce a data transmission amount, in S301, the message delivered by the application server 210 to the push server 220 is compressed data. Alternatively, in S301, the message delivered by the application server 210 to the push server 220 is uncompressed data. After receiving the message, the push server 220 compresses the message, and then pushes the compressed message to the terminal device 230.

In S331, the first application 234 first decompresses the first message, and then performs the message reassembly operation.

For another example, in an embodiment, to improve data security, in S301, the message delivered by the application server 210 to the push server 220 is encrypted data (end-to-end encrypted information). Alternatively, in S301, the message delivered by the application server 210 to the push server 220 is unencrypted data. After receiving the message, the push server 220 encrypts the message (end-to-end encrypted information), and then pushes the encrypted message to the terminal device 230.

In S331, the first application 234 first invokes an encryption/decryption interface to decrypt the first message, and then performs the message reassembly operation.

In this way, the push agent 232 does not participate in a decryption operation, and therefore cannot obtain specific content of the first message. In an entire process from receiving the pushed first message to displaying the second message, the push agent 232 can obtain only content obtained after message reassembly, thereby greatly improving message security.

Further, to avoid message leakage, in an embodiment, in S331, if an exception occurs when the first application 234 performs the message reassembly operation (for example, an exception occurs when the message reassembly code is executed), the following is performed after S331: preventing display of the second message (not displaying the notification message), and reporting the failure case to a server, so that an application developer can troubleshoot the problem.

Further, to enable the first application 234 to implement the message reassembly operation of the second application 236 based on the message reassembly configuration information, in an embodiment, the second application 236 invokes the first application 234 to generate the message reassembly configuration information. For example, the second application 236 invokes the first application 234 to configure message reassembly code and an initialization parameter for the first application 234.

Figures 4, 5:
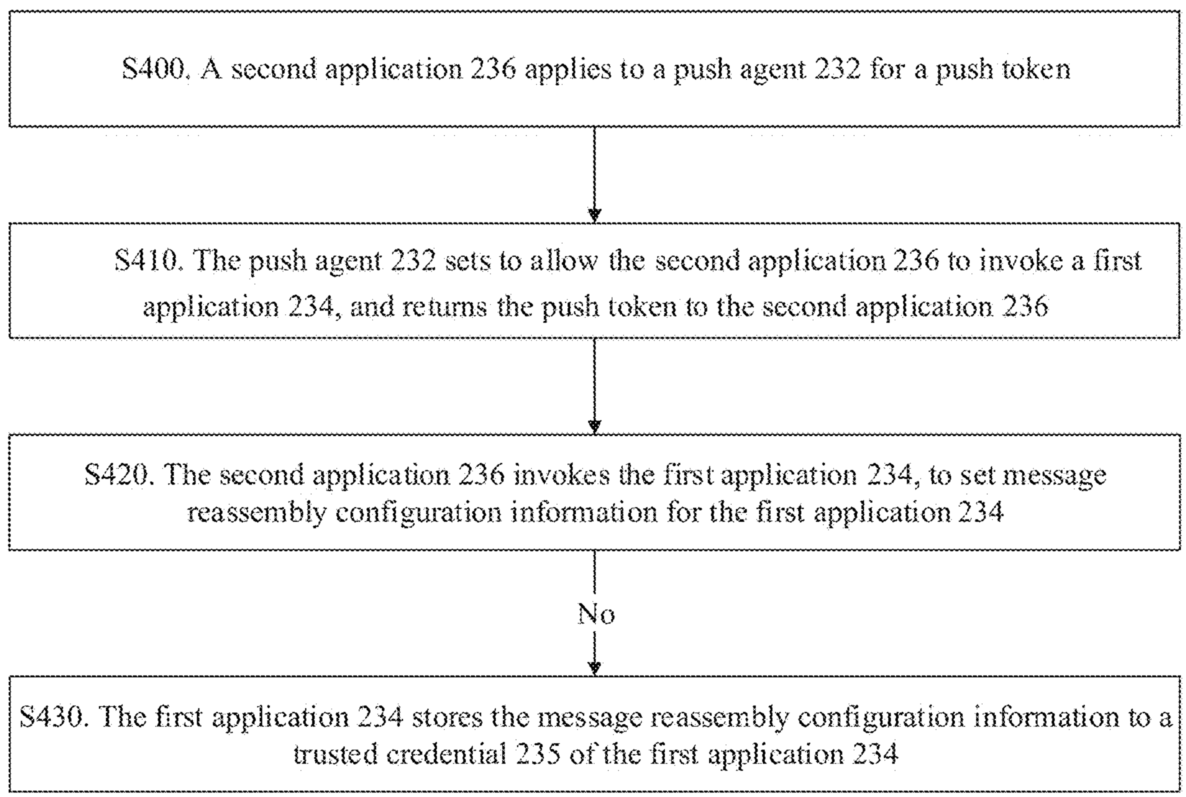
FIG. 4 is a flowchart of a message processing method according to an embodiment of this application.
FIG. 5 is a schematic diagram of a message processing apparatus according to an embodiment of this application.

FIG. 4 is a flowchart of a message processing method according to an embodiment of this application.

Before S310, the terminal device 230 performs the following procedure shown in FIG. 4 to obtain the message reassembly code and the initialization parameter for the first application 234.

S400. The second application 236 applies to the push agent 232 for a push token (Push Token).

S410. After receiving the application of the second application 236, the push agent 232 sets to allow the second application 236 to invoke the first application 234. Specifically, the second application 236 is authorized to be also used as a client applicant (CA) that can invoke a trusted application (first application 234).

In addition, the push agent 232 returns the push token to the second application 236.

Further, to improve security, in an embodiment, in S410, the push agent 232 obtains, from a cloud, a range of resources and interfaces (API) that the first application 234 is allowed to access. When running the message reassembly code, the first application 234 is limited by the range of accessed resources and interfaces. For example, the first application 234 is limited from accessing a network to download a resource such as an icon of the first message, and may only encrypt/decrypt the first message or perform localized formatting of message content text for the first message.

In S331, the first application 234 performs the message reassembly operation on the first message based on the message reassembly configuration information under a limitation of the range of resources and interfaces that the first application 234 is allowed to access, to generate the second message.

Based on the limitation of the range of accessed resources and interfaces, in a process in which the message reassembly operation is performed in the first application 234 (TA), only a controllable interface such as a basic data operation, encryption/decryption (API), and a corresponding application resource query is provided, and the first application 234 cannot pull up another application and access another controlled resource, thereby improving system running security.

S420. After the second application 236 obtains the push token, the second application 236 invokes the first application 234, to set the message reassembly configuration information (the message reassembly code and the initialization parameter) for the first application 234.

S430. The first application 234 stores the message reassembly configuration information (the message reassembly code and the initialization parameter) to the trusted credential 235 of the first application 234.

Based on the method in the embodiments of this application, an embodiment of this application further provides a message processing apparatus, and the apparatus is applied to a terminal device.

FIG. 5 is a schematic diagram of a message processing apparatus according to an embodiment of this application. As shown in FIG. 5, a message processing apparatus 500 includes:

a receiving module 510, configured to receive a first message, where specifically, in an embodiment, with reference to the push agent 232, the receiving module 510 is constructed in the push agent 232;

a message reassembly module 520, configured to pull up a first application module when the first message is a reassembly message, where specifically, in an embodiment, with reference to the push agent 232, the message reassembly module 520 is constructed in the push agent 232; and the first application module 530 (with reference to the first application 234), configured to:

read message reassembly configuration information (in an embodiment, the message reassembly configuration information is stored in the trusted credential 235), where the message reassembly configuration information is information configured by a second application module (with reference to the second application 236) for the first application module 530, an operation capable of being implemented by the second application module includes at least a message reassembly operation, and the message reassembly configuration information is used to support the first application module 530 in implementing the message reassembly operation; and perform the message reassembly operation on the first message based on the message reassembly configuration information, to generate a second message.

In the description of this embodiment of this application, for ease of description, when the apparatus is described, the apparatus is divided into various modules based on functions for description, and the division of the modules is only logical function division. When this embodiment of this application is implemented, the functions of the modules may be implemented in one or more pieces of software and/or hardware.

Specifically, in actual implementation, the apparatus provided in this embodiment of this application may be all or partially integrated into one physical entity, or may be physically separated. In addition, all these modules may be implemented by software invoked by a processing element, or may be implemented by hardware; or some modules may be implemented by software invoked by a processing element, and some modules are implemented by hardware. For example, a detection module may be a separate processing element, or may be integrated into a chip of the electronic device for implementation. The implementation of another module is similar thereto. In addition, all or some of these modules may be integrated together, or may be implemented independently. In an implementation process, the steps of the foregoing method or the foregoing modules may be implemented by using an integrated logic circuit of hardware in the processor element or an instruction in a form of software.

For example, these foregoing modules may be one or more integrated circuits configured to implement the foregoing method, such as one or more application-specific integrated circuits (ASICs), one or more digital signal processors (DSPs), or one or more field programmable gate arrays (FPGAs). For another example, these modules may be integrated together, and implemented in a form of a system-on-a-chip (SOC).

An embodiment of this application further provides an electronic device (a terminal device). The electronic device includes a memory configured to store a computer program instruction and a processor configured to execute a program instruction. When the computer program instruction is executed by the processor, the electronic device is triggered to perform the method procedure described in the embodiments of this application.

Specifically, in an embodiment of this application, the foregoing one or more computer programs are stored in the foregoing memory, the foregoing one or more computer programs include instructions, and when the foregoing instructions are executed by the foregoing device, the foregoing device is enabled to perform the steps of the method described in the embodiments of this application.

Figure 6:
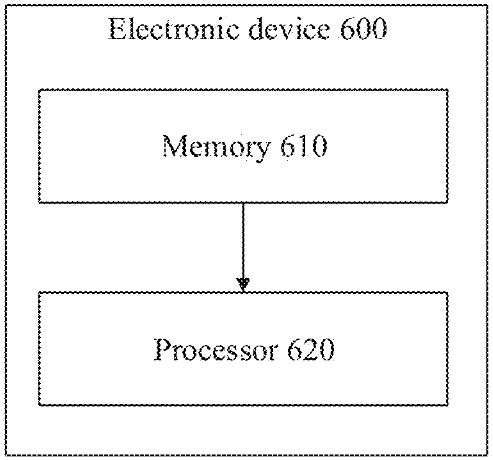
FIG. 6 is a schematic diagram of an electronic device according to an embodiment of this application.

FIG. 6 is a schematic diagram of an electronic device according to an embodiment of this application. An electronic device 600 includes a memory 610 configured to store a computer program instruction and a processor 620 configured to execute a program instruction. When the computer program instruction is executed by the processor 620, the processor 620 controls the electronic device 600 to perform the stylus state switching method described in the embodiments of this application.

Specifically, in an embodiment of this application, the processor of the electronic device may be a system-on-a-chip SOC, and the processor may include a central processing unit (CPU), and may further include another type of processor. Specifically, in an embodiment of this application, the processor of the electronic device may be a PWM control chip.

Specifically, in an embodiment of this application, the involved processor may include, for example, a CPU, a DSP, a microcontroller, or a digital signal processor, and may further include a GPU, an embedded neural-network processing unit (NPU), and an image signal processor (ISP). The processor may further include a necessary hardware accelerator or logic processing hardware circuit, such as an ASIC, one or more integrated circuits configured to control program execution of a technical solutions in this application, or the like. In addition, the processor may have a function of operating one or more software programs, and the software programs may be stored in a storage medium.

Specifically, in an embodiment of this application, the memory of the electronic device may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium, or another magnetic storage device; or may be any computer-readable medium that can be used to carry or store expected program code in a form of an instruction or a data structure and that can be accessed by a computer.

Specifically, in an embodiment of this application, the processor and the memory may be combined into a processing apparatus, and more commonly, may be components independent of each other. The processor is configured to execute program code stored in the memory to implement the method described in the embodiments of this application. During specific implementation, the memory may be integrated in the processor, or may be independent of the processor.

Further, the device, apparatus, and modules illustrated in the embodiments of this application may be specifically implemented by a computer chip or entity, or may be implemented by a product with a specific function.

A person skilled in the art should understand that the embodiments of this application may be provided as a method, an apparatus, or a computer program product. Therefore, the present disclosure can use a form of hardware only embodiments, software only embodiments, or embodiments with a combination of software and hardware. In addition, the present disclosure can use a form of a computer program product that is implemented on one or more computer-usable storage media that include computer-usable program code.

In several embodiments provided in this application, if any function is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of this application.

Specifically, an embodiment of this application further provides a computer-readable storage medium, where the computer-readable storage medium stores a computer program, and when the computer program runs on a computer, the computer is enabled to perform the method provided in the embodiments of this application.

An embodiment of this application further provides a computer program product, where the computer program product includes a computer program, and when the computer program is run on a computer, the computer is enabled to perform the method provided in the embodiments of this application.

The embodiments of this application are described with reference to the flowcharts and/or block diagrams of the method, the device (apparatus), and the computer program product according to embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided to a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may also be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may also be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

It should also be noted that, in the embodiments of this application, "at least one" means one or more, and "a plurality of" means two or more. The term "and/or" describes an association relationship of associated objects, and indicates that three relationships may exist. For example, A and/or B may indicate the following three cases: Only A exists, both A and B exist, and only B exists. A and B may be singular or plural. The character "/" usually indicates an "or" relationship between associated objects. "At least one of the following" or a similar expression thereof is any combination of these items, including a single item or any combination of a plurality of items. For example, at least one of a, b, and c may represent a, b, c, a and b, a and c, b and c, or a, b, and c, where a, b, and c may be singular or plural.

In the embodiments of this application, the term "include", "comprise", or any other variant thereof is intended to cover non-exclusive inclusion, so that a process, method, commodity, or device that includes a series of elements includes not only those elements but also other elements that are not expressly listed, or includes elements inherent to such a process, method, commodity, or device. Without further limitation, the element defined by the sentence "including a" does not exclude that other identical elements also exist in the process, method, commodity, or device including the element.

This application may be described in the general context of computer-executable instructions, such as a program module, executed by a computer. Generally, the program module includes a routine, a program, an object, a component, a data structure, and the like that perform a specific task or implement a specific abstract data type. Alternatively, this application may be practiced in distributed computing environments. In these distributed computing environments, a task is performed by a remote processing device connected by using a communication network. In the distributed computing environments, the program module may be located in local and remote computer storage media including storage devices.

Embodiments of this application are described in a progressive manner, and for the same and similar parts of embodiments, reference may be made to each other. Each embodiment focuses on a difference from other embodiments. Especially, for the apparatus embodiment, the apparatus embodiment is basically similar to the method embodiment, and therefore is described briefly. For related parts, refer to the partial description of the method embodiment.

A person of ordinary skill in the art may be aware that the units and algorithm steps described in the embodiments of this application can be implemented by electronic hardware or a combination of computer software and electronic hardware. Whether these functions are performed by hardware or software depends on specific applications and design constraints of the technical solutions. A person skilled in the art may use different methods to implement the described functions for each specific application, but it should not be considered that such an implementation goes beyond the scope of this application.

It may be clearly understood by a person skilled in the art that, for convenience and brevity of description, for a specific working process of the described apparatus, apparatus, and unit, refer to a corresponding process in the foregoing method embodiments. Details are not described herein again.

The foregoing descriptions are merely specific implementations of this application, and any change or replacement readily figured out by a person skilled in the art within the technical scope disclosed in this application shall fall within the protection scope of this application. The protection scope of this application shall be subject to the protection scope of the claims.

The invention claimed is:

1. A message processing method, the method comprising:

receiving, by push agent software that is executed by a processor included in a terminal device, a first message from a server device;

based on the push agent software determining that the first message is a reassembly message, starting, by the push agent software, a first application; and invoking, by the push agent software, the first application to perform message reassembly on the first message, wherein performing the message reassembly comprises:

reading, by the first application, message reassembly configuration information, wherein the message reassembly configuration information is information configured by a second application for the first application, wherein an operation capable of being implemented by the second application comprises at least a message reassembly operation, and the message reassembly configuration information is used to support the first application in implementing the message reassembly operation; and performing, by the first application, the message reassembly operation on the first message based on the message reassembly configuration information, to generate a second message.

2. The method according to claim 1, wherein the first application is a trusted application.

3. The method according to claim 2, wherein the message reassembly configuration information is stored in a trusted credential of the first application.

4. The method according to claim 1, wherein the message reassembly configuration information comprises message reassembly code and an initialization parameter; and wherein the performing, by the first application, the message reassembly operation on the first message based on the message reassembly configuration information, to generate the second message comprises:

executing, by the first application, the message reassembly code for the first message based on the initialization parameter, to generate the second message.

5. The method according to claim 1, wherein before the receiving the first message by the push agent software, the second application invokes the first application, to set the message reassembly configuration information.

6. The method according to claim 1, wherein before the receiving the first message by the push agent software, the method further comprises:

obtaining, from a cloud, a range of resources and interfaces that the first application is allowed to access;

wherein the performing, by the first application, the message reassembly operation on the first message based on the message reassembly configuration information, to generate the second message comprises:

performing, by the first application, the message reassembly operation on the first message based on the message reassembly configuration information under a limitation of the range of resources and interfaces that the first application is allowed to access, to generate the second message.

7. The method according to claim 6, wherein the obtaining, from the cloud, the range of resources and interfaces that the first application is allowed to access comprises:

obtaining, by the push agent software from the cloud, the range of resources and interfaces that the first application is allowed to access.

8. The method according to claim 1, wherein the method further comprises:

outputting the second message for display.

9. The method according to claim 8, wherein the outputting the second message for display comprises:

outputting, by the first application, the second message to the push agent software; and outputting, by the push agent software, the second message to a notification manager software for message display.

10. The method according to claim 8, wherein the method further comprises:

based on an exception occurring when the first application performs the message reassembly operation, preventing display of the second message.

11. The method according to claim 1, wherein before the receiving the first message by the push agent software, the method further comprises:

sending, by the second application, an application to the push agent software for a push token;

after receiving the application for the push token from the second application, setting, by the push agent software, to allow the second application to invoke the first application, and returning, by the push agent software, the push token to the second application;

after the second application obtains the push token, invoking, by the second application, the first application, to set the message reassembly configuration information for the first application; and storing, by the first application, the message reassembly configuration information.

12. The method according to claim 1, wherein the first message is end-to-end encrypted information; and wherein in a process in which the first application performs the message reassembly operation on the first message, the first application invokes an encryption/decryption interface to decrypt the first message.

13. An electronic device, comprising:

a memory configured to store computer instructions; and a processor configured to execute the computer instructions to cause the electronic device to perform operations comprising:

receiving, by push agent software that is executed by the processor, a first message from a server device;

based on the push agent software determining that the first message is a reassembly message, starting, by the push agent software, a first application; and invoking, by the push agent software, the first application to perform message reassembly on the first message, wherein performing the message reassembly comprises:

reading, by the first application, message reassembly configuration information, wherein the message reassembly configuration information is information configured by a second application for the first application, wherein an operation capable of being implemented by the second application comprises at least a message reassembly operation, and the message reassembly configuration information is used to support the first application in implementing the message reassembly operation; and performing, by the first application, the message reassembly operation on the first message based on the message reassembly configuration information, to generate a second message.

14. The electronic device according to claim 13, wherein the first application is a trusted application.

15. The electronic device according to claim 14, wherein the message reassembly configuration information is stored in a trusted credential of the first application.

16. The electronic device according to claim 13, wherein the message reassembly configuration information comprises message reassembly code and an initialization parameter, and the performing, by the first application, the message reassembly operation on the first message based on the message reassembly configuration information, to generate the second message comprises:

executing, by the first application, the message reassembly code for the first message based on the initialization parameter, to generate the second message.

17. The electronic device according to claim 13, wherein the second application invokes the first application, to set the message reassembly configuration information.

18. The electronic device according to claim 13, wherein when the processor executes the computer instructions, the electronic device further performs operations comprising:

obtaining, from a cloud, a range of resources and interfaces that the first application is allowed to access; and performing the message reassembly operation on the first message based on the message reassembly configuration information under a limitation of the range of resources and interfaces that the first application is allowed to access, to generate the second message.

19. A non-transitory computer-readable storage medium storing a computer program, wherein when the computer program is executed by a processor included in an electronic device, the electronic device performs operations comprising:

receiving, by push agent software that is executed by the processor, a first message from a server device;

based on the push agent software determining that the first message is a reassembly message, starting, by the push agent software, a first application; and invoking, by the push agent software, the first application to perform message reassembly on the first message, wherein performing the message reassembly comprises:

reading, by the first application, message reassembly configuration information, wherein the message reassembly configuration information is information configured by a second application for the first application, wherein an operation capable of being implemented by the second application comprises at least a message reassembly operation, and the message reassembly configuration information is used to support the first application in implementing the message reassembly operation; and performing, by the first application, the message reassembly operation on the first message based on the message reassembly configuration information, to generate a second message.

* * * * *